United States Patent
Fujii et al.

(10) Patent No.: US 10,612,783 B2
(45) Date of Patent: Apr. 7, 2020

(54) COMBUSTOR REPLACEMENT METHOD AND GAS TURBINE PLANT

(71) Applicant: MITSUBISHI HITACHI POWER SYSTEMS, LTD., Kanagawa (JP)

(72) Inventors: Keita Fujii, Kanagawa (JP); Shin Akazawa, Kanagawa (JP); Nobukazu Ishii, Kanagawa (JP); Masahiro Matsubara, Kanagawa (JP); Masayuki Murakami, Kanagawa (JP); Fuminori Fujii, Kanagawa (JP); Hiroshi Tanabe, Kanagawa (JP); Masaru Takamatsu, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 769 days.

(21) Appl. No.: 15/301,492

(22) PCT Filed: May 19, 2015

(86) PCT No.: PCT/JP2015/064365
§ 371 (c)(1),
(2) Date: Oct. 3, 2016

(87) PCT Pub. No.: WO2015/178389
PCT Pub. Date: Nov. 26, 2015

(65) Prior Publication Data
US 2017/0030583 A1 Feb. 2, 2017

(30) Foreign Application Priority Data

May 23, 2014 (JP) .................................. 2014-107430

(51) Int. Cl.
*F23R 3/34* (2006.01)
*F23R 3/28* (2006.01)
(Continued)

(52) U.S. Cl.
CPC ............... *F23R 3/346* (2013.01); *F02C 7/20* (2013.01); *F02C 7/222* (2013.01); *F02C 7/228* (2013.01);
(Continued)

(58) Field of Classification Search
CPC .............. F23R 3/60; F23R 2900/00016; F23R 2900/00017; F23R 2900/00019;
(Continued)

(56) References Cited

U.S. PATENT DOCUMENTS 2,374,239 A * 4/1945 Sedille ...................... F02C 9/40
60/39.15
5,911,680 A * 6/1999 Takeoka ................ F01D 25/285
431/154
(Continued)

FOREIGN PATENT DOCUMENTS

JP 10-196402 7/1998
JP 11-117769 4/1999
(Continued)

OTHER PUBLICATIONS

International Search Report dated Aug. 18, 2015 in International (PCT) Application No. PCT/JP2015/064365.
(Continued)

*Primary Examiner* — Alain Chau
(74) *Attorney, Agent, or Firm* — Wenderoth, Lind & Ponack, L.L.P.

(57) ABSTRACT

A combustor replacement method and a gas turbine plant capable of efficiently replacing a combustor using an existing facility. The combustor replacement method includes a step of separating, from a plurality of fuel supply systems, a first combustor that includes a plurality of nozzle systems connected to any of the plurality of fuel supply systems and supplied with fuel from the connected fuel supply systems,
(Continued)

and removing the first combustor from a gas turbine plant. The method includes a step of attaching a second combustor that includes fewer nozzle systems than the first combustor to the gas turbine plant, and a step of providing communication between the fuel supply systems connected to the same nozzle system of the second combustor by a coupling pipe, and coupling the fuel supply systems and the second combustor.

7 Claims, 14 Drawing Sheets

(51) Int. Cl.
*F02C 7/228* (2006.01)
*F23R 3/60* (2006.01)
*F02C 7/20* (2006.01)
*F02C 9/32* (2006.01)
*F02C 7/22* (2006.01)
*F02C 7/232* (2006.01)

(52) U.S. Cl.
CPC ............... *F02C 7/232* (2013.01); *F02C 9/32* (2013.01); *F23R 3/28* (2013.01); *F23R 3/60* (2013.01); *F05D 2220/32* (2013.01); *F05D 2230/60* (2013.01); *F05D 2230/70* (2013.01); *F05D 2230/80* (2013.01); *F05D 2240/35* (2013.01); *F23R 2900/00016* (2013.01); *F23R 2900/00017* (2013.01)

(58) Field of Classification Search
CPC .... F23R 3/28; F23R 3/34; F23R 3/346; F02C 7/222; F02C 7/228; F02C 7/232; F02C 9/263; F02C 9/40; F02C 7/20; F02C 9/32; F05D 2230/80; F05D 2230/60; F05D 2230/70

See application file for complete search history.

(56) References Cited

U.S. PATENT DOCUMENTS

| | | | | | |
|---|---|---|---|---|---|
| 5,921,075 | A | * | 7/1999 | Shimoyama | F01D 25/285 431/154 |
| 6,125,624 | A | * | 10/2000 | Prociw | F02C 7/232 60/39.094 |
| 6,141,862 | A | * | 11/2000 | Matsui | F01D 25/285 29/714 |
| 6,367,239 | B1 | * | 4/2002 | Brown | F01D 19/00 60/775 |
| 7,464,555 | B2 | * | 12/2008 | Bachovchin | F02C 3/28 60/723 |
| 8,607,451 | B2 | * | 12/2013 | Arase | F01D 9/023 269/47 |
| 8,973,366 | B2 | * | 3/2015 | Zhang | F23K 5/06 137/897 |
| 9,080,513 | B2 | * | 7/2015 | Ziminsky | F02C 3/22 |
| 9,127,593 | B2 | * | 9/2015 | Sancewich | F23R 3/283 |
| 9,140,142 | B2 | * | 9/2015 | Shiotani | F01D 9/023 |
| 9,243,804 | B2 | * | 1/2016 | Zhang | F23K 5/005 |
| 9,255,522 | B2 | * | 2/2016 | Sancewich | F01D 9/026 |
| 9,404,390 | B2 | * | 8/2016 | Griese | F01D 25/285 |
| 2001/0000282 | A1 | * | 4/2001 | Poleshuk | B67D 7/16 137/98 |
| 2006/0016198 | A1 | | 1/2006 | Stuttaford et al. | |
| 2009/0107105 | A1 | * | 4/2009 | Ziminsky | F02C 3/22 60/39.463 |
| 2009/0272098 | A1 | | 11/2009 | Lawson et al. | |
| 2010/0058770 | A1 | * | 3/2010 | Ryan | F23D 11/38 60/776 |
| 2011/0000080 | A1 | | 1/2011 | Arase et al. | |
| 2013/0097991 | A1 | * | 4/2013 | Zhang | F23K 5/06 60/39.59 |
| 2013/0098041 | A1 | * | 4/2013 | Zhang | F23K 5/005 60/734 |
| 2014/0123656 | A1 | * | 5/2014 | Sancewich | F01D 9/026 60/752 |
| 2014/0123680 | A1 | * | 5/2014 | Sancewich | F23R 3/283 60/805 |

FOREIGN PATENT DOCUMENTS

| | | |
|---|---|---|
| JP | 2009-243310 | 10/2009 |
| JP | 2009-270575 | 11/2009 |

OTHER PUBLICATIONS

English translation of Written Opinion of the International Searching Authority dated Aug. 18, 2015 in corresponding International (PCT) Application No. PCT/JP2015/064365.

* cited by examiner

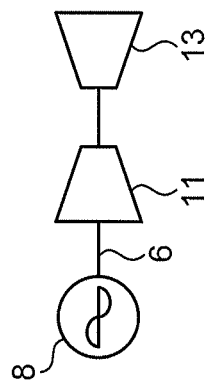
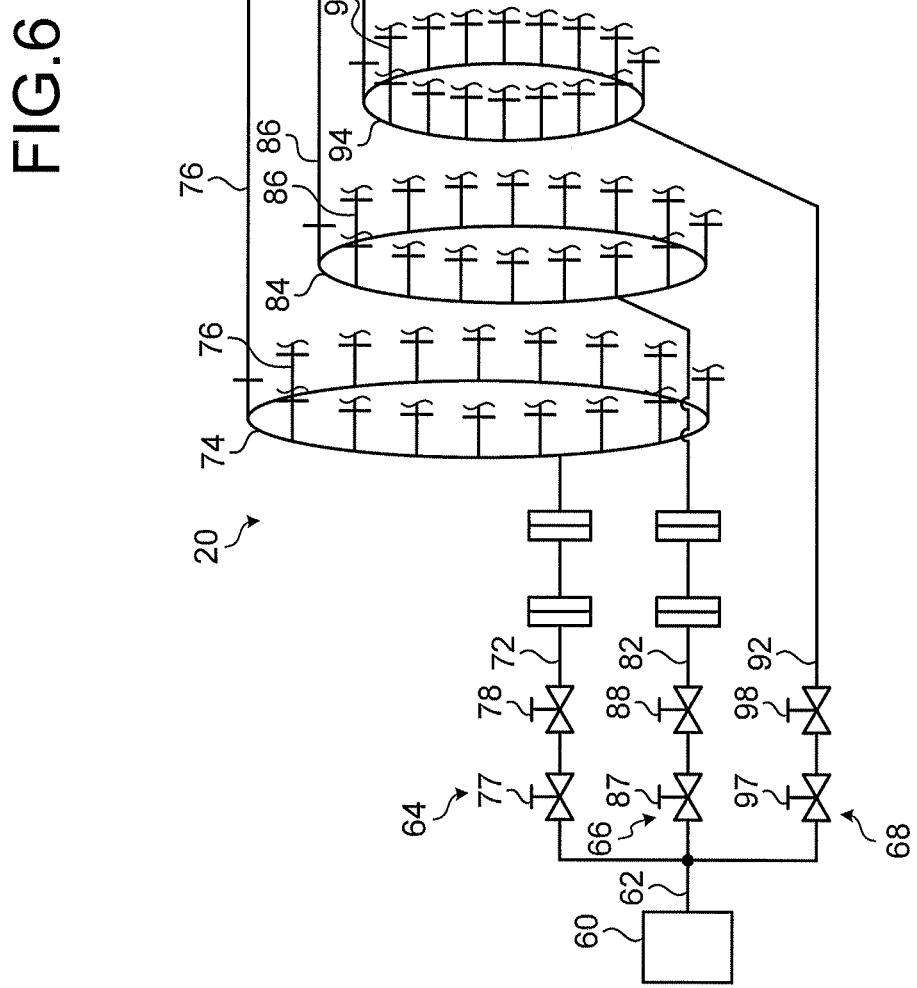
FIG.6

FIG.13
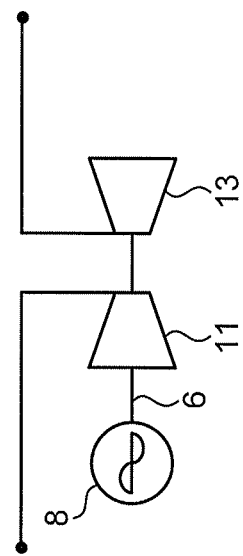
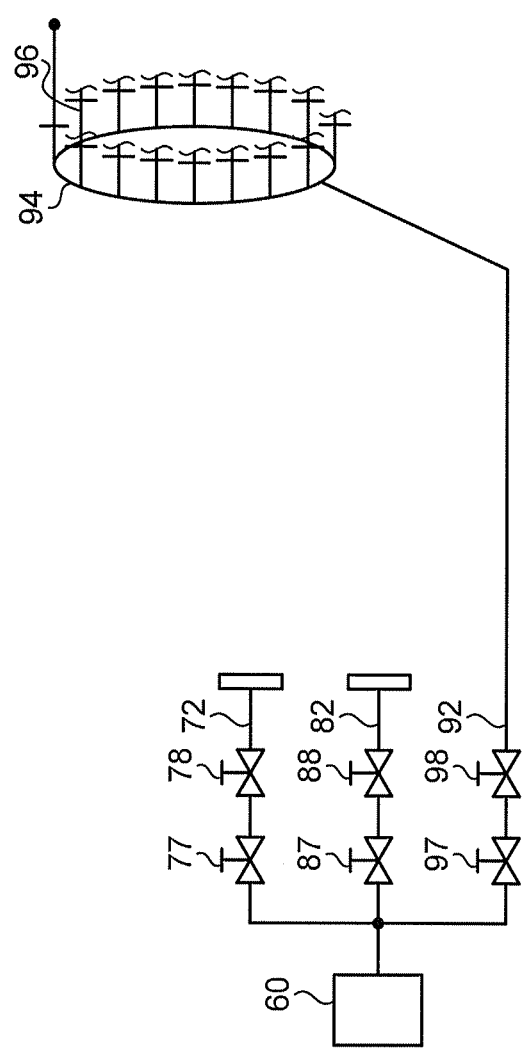

COMBUSTOR REPLACEMENT METHOD AND GAS TURBINE PLANT

FIELD

The present invention relates to a combustor replacement method for replacing a combustor in a gas turbine which generates a combustion gas through combustion of compressed air and fuel therein, and a gas turbine plant.

BACKGROUND

A general gas turbine includes a compressor, a combustor, and a turbine. Air introduced from an air inlet is compressed by the compressor into compressed air at a high temperature and high pressure. In the combustor, fuel is supplied to the compressed air to cause combustion, thereby obtaining a combustion gas (working fluid) at a high temperature and high pressure. The turbine is driven by the combustion gas, thereby driving a generator coupled to the turbine.

Fuel is supplied to a combustor through a plurality of routes. For example, in Patent Literature 1, a gas turbine plant is described in which a plurality of main combustion burners is disposed so as to surround a pilot combustion burner, and supply is made through each of a fuel supply system for supplying fuel to the pilot combustion burner and a fuel supply systems for supplying fuel to the plurality of main combustion burners. In addition, a plurality of fuel supply systems for supplying fuel to the plurality of main combustion burners is provided in Patent Literature 1. Furthermore, in some gas turbines, fuel is supplied from a top hat nozzle besides a main nozzle and a pilot nozzle. Such a gas turbine including a top hat nozzle is provided with a fuel system for supplying fuel to the top hat nozzle.

CITATION LIST

Patent Literature

Patent Literature 1: Japanese Laid-open Patent Publication No. 11-117769

SUMMARY

Technical Problem

There may be a case where a combustor is replaced in a gas turbine plant. In that case, when the combustor is replaced with not a combustor driven in the same fuel supply system but a combustor driven in a different fuel supply system, the fuel supply system is also replaced, which leads to an increase in work, and in cost.

The present invention is to solve the above problem, and an object thereof is to provide a combustor replacement method and a gas turbine plant capable of efficiently replacing a combustor using an existing facility.

Solution to Problem

According to an aspect of the present invention, a combustor replacement method for replacing a combustor of a gas turbine in a gas turbine plant including the combustor and a plurality of fuel supply systems that supplies fuel to the combustor, comprises the steps of: separating, from the fuel supply systems, a first combustor that comprises a plurality of nozzle systems connected to any of the plurality of fuel supply systems and supplied with the fuel from the connected fuel supply systems, and removing the first combustor from the gas turbine plant; attaching a second combustor that comprises fewer nozzle systems than the first combustor to the gas turbine plant; and providing communication between the fuel supply systems connected to the same nozzle system of the second combustor by a coupling pipe, and coupling the fuel supply systems and the second combustor.

Consequently, it is possible to perform replacement with a combustor including a different nozzle system while appropriating a system which supplies fuel to a combustor. In addition, by connecting a plurality of fuel supply systems to one nozzle system, it is possible to maintain, before and after the replacement, an amount of fuel which can be supplied. Consequently, it is possible to reduce work necessary for the replacement and to reduce cost as well.

Advantageously, in the combustor replacement method, the fuel supply systems comprise manifolds and branch pipes that connect the manifolds and the nozzle systems, and the coupling pipe connects the branch pipe and the branch pipe. Consequently, it is possible to perform replacement with a combustor including a different nozzle system without replacing the manifold.

Advantageously, the combustor replacement method further comprises a step of providing communication between the fuel supply systems by an upstream side coupling pipe on an upstream side of the manifolds connected to the same nozzle system of the second combustor. Consequently, it is possible to maintain a flow of fuel through the fuel supply systems communicating with each other, and to further stabilize combustion in the combustor after the replacement.

Advantageously, in the combustor replacement method, the upstream side coupling pipe is disposed in the vicinity of tie-in points of the manifolds. Consequently, it is possible to further stabilize combustion in the combustor after the replacement. In addition, it is possible to use an existing pipe on the upstream side as a long pipe. In other words, it is possible to reuse the existing pipe as much as possible, and to shorten the length of a pipe to be replaced.

Advantageously, in the combustor replacement method, the upstream side coupling pipe comprises an on-off valve disposed thereon. Consequently, it is possible to control fuel supply for each fuel supply system. In addition, even in a case where a design has been changed such that a manifold is provided for each fuel supply system on a downstream side of the upstream side coupling pipe, it is possible to leave the upstream coupling pipe unchanged, so that the replacement can be performed easily, and the degree of freedom in control design can be further increased.

Advantageously, in the combustor replacement method, the fuel supply systems each comprise a regulating valve that regulates supply of the fuel on an upstream side of the manifold, and the upstream side coupling pipe is disposed between the manifold and the regulating valve. Consequently, it is possible to further stabilize combustion in the combustor after the replacement.

Advantageously, the combustor replacement method comprises the steps of: removing respective manifolds of the fuel supply systems connected to the same nozzle system of the second combustor; and providing a common manifold in the fuel supply systems connected to the same nozzle system of the second combustor. The coupling pipe is provided on an upstream side of the manifold. Consequently, it is possible to replace the combustor with simple work.

According to another aspect of the present invention, a gas turbine plant comprises: a combustor that comprises nozzle systems supplied with fuel; a plurality of fuel supply systems that supplies the fuel to the combustor; and a coupling pipe that provides communication between the fuel supply systems connected to the same nozzle system of the combustor, and couples the fuel supply systems and the combustor. Consequently, it is possible to use an existing facility effectively.

Advantageously, the gas turbine plant comprises: a control device that controls the fuel supplied from the plurality of fuel supply systems; and pressure regulating valves and flow regulating valves provided on the fuel supply systems. The control device independently controls the pressure regulating valves of the plurality of fuel supply systems, and independently controls the flow regulating valves of the plurality of fuel supply systems. Consequently, it is possible to appropriately control combustion in the combustor.

Advantageously, the gas turbine plant comprises: a control device that controls the fuel supplied from the plurality of fuel supply systems; and pressure regulating valves and flow regulating valves provided on the fuel supply systems. The control device controls the pressure regulating valves of the plurality of fuel supply systems in an interlocking manner, and controls the flow regulating valves of the plurality of fuel supply systems in an interlocking manner. Consequently, it is possible to appropriately control combustion in the combustor.

Advantageously, in the gas turbine plant, the fuel supply systems comprise, for each nozzle system, a manifold and a branch pipe that connects the manifold and the nozzle system, and the coupling pipe connects the branch pipe and the branch pipe. Consequently, it is possible to use an existing facility effectively.

Advantageously, the gas turbine plant comprises: on an upstream side of the manifolds connected to the same nozzle system, an upstream side coupling pipe that provides communication between the fuel supply systems; and an on-off valve disposed on the upstream side coupling pipe. Consequently, it is possible to control fuel supply for each fuel supply system. In addition, even in a case where a design has been changed such that a manifold is provided for each fuel supply system on a downstream side of the upstream side coupling pipe, it is possible to leave the upstream coupling pipe unchanged, so that the replacement can be performed easily, and the degree of freedom in control design can be further increased.

Advantageously, in the gas turbine plant, the fuel supply systems comprise one manifold connected to the plurality of nozzle systems, and the coupling pipe is provided on an upstream side of the manifold. Consequently, it is possible to use an existing facility effectively.

Advantageous Effects of Invention

According to the present invention, it is possible to replace a combustor efficiently using an existing facility.

BRIEF DESCRIPTION OF DRAWINGS

FIG. 6 is a configuration diagram schematically illustrating a state where a combustor is being replaced.

FIG. 13 is a configuration diagram schematically illustrating a state where a combustor is being replaced.

DESCRIPTION OF EMBODIMENTS

Modes for carrying out the present invention (embodiments) will be described in detail with reference to the drawings. The present invention is not limited to the embodiments, and when there is a plurality of embodiments, the present invention encompasses those configured by combining each of the embodiments. Furthermore, the components described below include those easily arrived at by a person skilled in the art, and those substantially the same. In addition, the components described below can be appropriately combined.

First Embodiment

Figure 1:
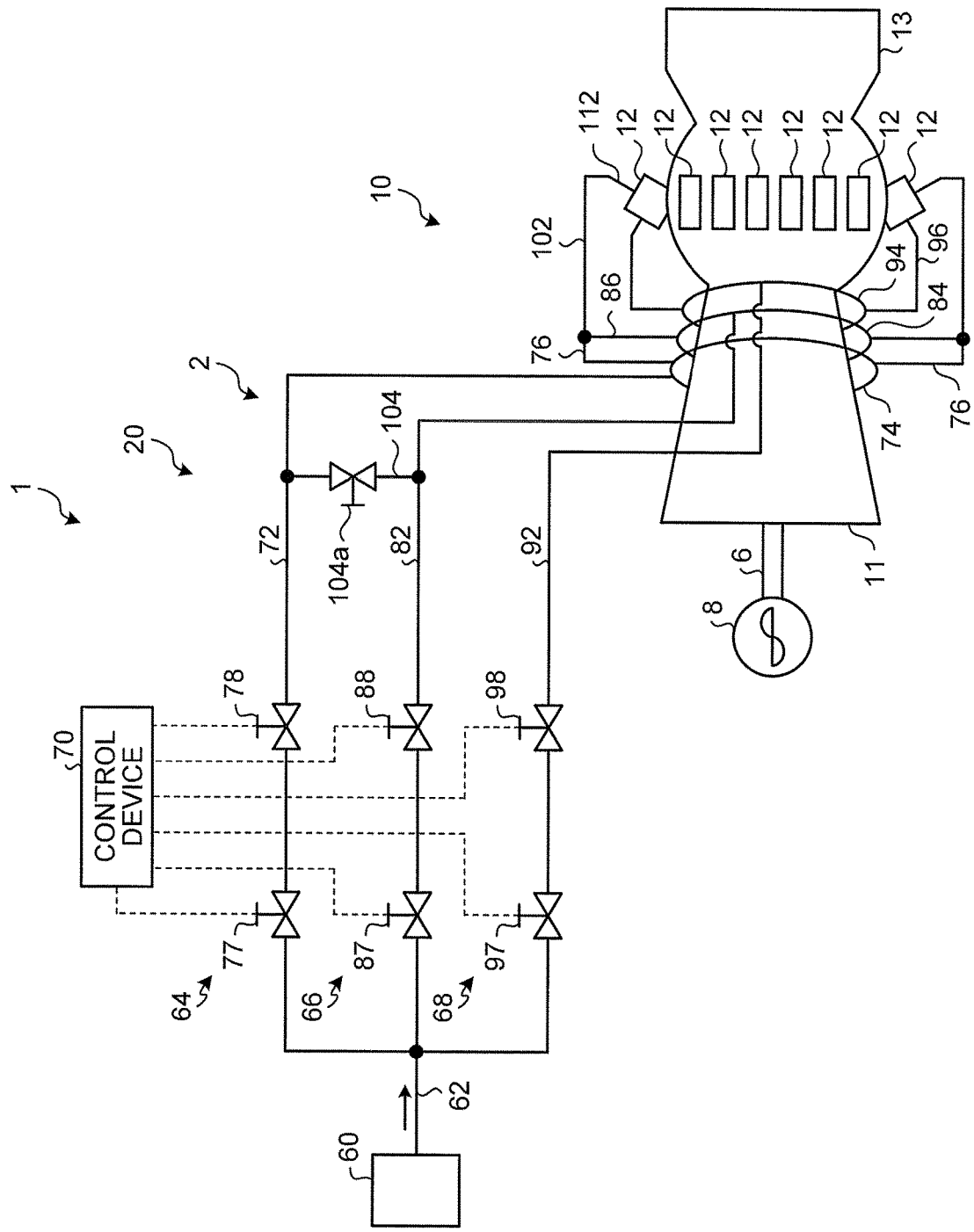
FIG. 1 is a configuration diagram schematically illustrating a power generation system including a gas turbine plant according to a first embodiment.
Figure 2:
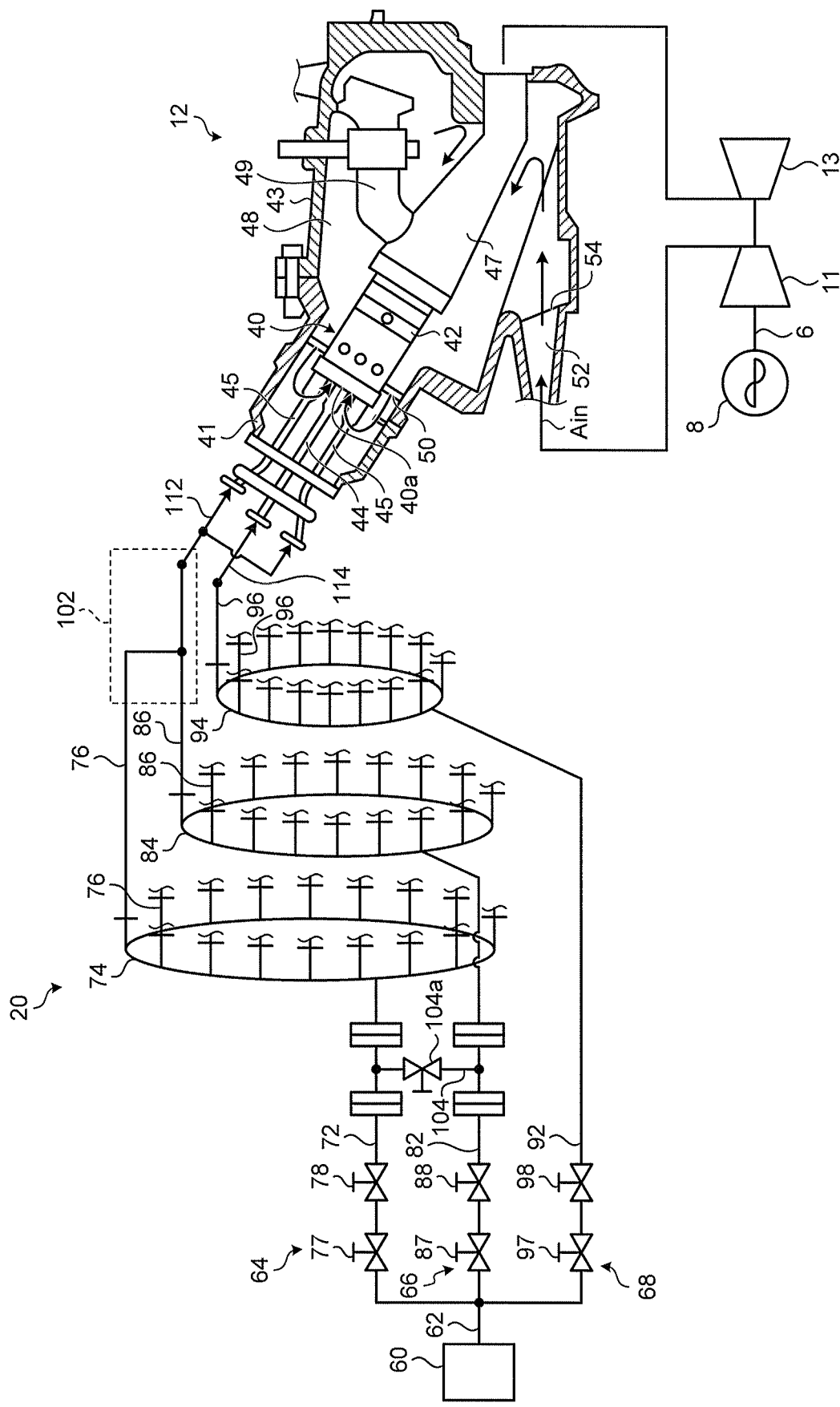
FIG. 2 is a configuration diagram schematically illustrating configurations of a fuel supply device and a combustor in the gas turbine plant illustrated in FIG. 1.

FIG. 1 is a configuration diagram schematically illustrating a power generation system including a gas turbine plant according to a first embodiment. FIG. 2 is a configuration diagram schematically illustrating configurations of a fuel supply device and a combustor in the gas turbine plant illustrated in FIG. 1. As illustrated in FIG. 1, the power generation system 1 including the gas turbine plant according to the embodiment includes the gas turbine plant 2, a coupling shaft 6, and a generator 8. The coupling shaft 6 couples a rotation unit of the gas turbine plant 2 and the generator 8. The rotation of the gas turbine plant 2 is transmitted to the generator 8 through the coupling shaft 6, and thereby the generator 8 is rotated and generates power.

The gas turbine plant 2 includes a gas turbine 10 and a fuel supply device 20. The gas turbine 10 includes a compressor 11, a plurality of combustors 12, and a turbine 13. The combustors 12 are disposed at predetermined intervals in a rotation direction of the gas turbine 10.

The compressor 11 includes an air inlet for introducing air thereinto, and in a compressor casing, an inlet guide vane (IGV) is disposed and pluralities of vanes and blades are alternately disposed in a longitudinal direction. By supplying fuel to compressed air compressed by the compressor 11, and igniting the mixture of the fuel and the compressed air, the combustor 12 can cause combustion. The turbine 13 has pluralities of vanes and blades alternately disposed in a turbine casing in a longitudinal direction. In the gas turbine 10, a rotor (rotation shaft) is positioned so as to penetrate the centers of the compressor 11, the combustors 12, and the turbine 13. The blades of the compressor 11 and the blades of the turbine 13 are fixed to the rotor. The generator 8 is coupled to the rotor of the gas turbine 10 through the coupling shaft 6.

In the gas turbine 10, air introduced thereinto from the air inlet of the compressor 11 is compressed, by passing through the inlet guide vane and the pluralities of vanes and blades, into compressed air at a high temperature and high pressure. In the combustor 12, predetermined fuel is supplied to the compressed air, and combustion is caused. Then, combustion gas at a high temperature and high pressure, which is a working fluid, generated in the combustor 12 passes through the pluralities of vanes and blades included in the turbine 13 to rotary drive the rotor, and to drive the generator 8 through the coupling shaft 6 coupled to the rotor. The energy of a flue gas (combustion gas) is transformed into pressure by a flue gas diffuser in a flue gas chamber, and after the speed is reduced, the flue gas is discharged to the atmosphere.

FIG. 2 is a configuration diagram schematically illustrating configurations of the fuel supply device and the combustor in the gas turbine plant illustrated in FIG. 1. As illustrated in FIG. 2, in the combustor 12, a combustor basket 42 of a combustor main body 40 is supported at predetermined intervals in a circumferential direction of the inside of a combustor compressor casing 41 and a turbine casing 43.

Compressed air Ain flows into a chamber 48, which is covered with the turbine casing 43, from the above-described compressor 11 through a diffuser unit 52 and a strut 54 located at an outlet of the compressor. The strut 54 can straighten a flow of the compressed air Ain in the diffuser unit 52. The compressed air Ain is introduced into an air inflow port 40a in the combustor basket 42 from the chamber 48 through a flow straightening plate 50 constituted by a porous plate.

A transition piece 47 is coupled to a rear end portion of the combustor basket 42. A pilot combustion burner 44 is disposed at a central position of the inside of the combustor basket 42. Furthermore, a plurality of main combustion burners 45 is disposed in the combustor basket 42, at an inner circumferential surface of the combustor basket 42 along the circumferential direction, so as to surround the pilot combustion burner 44. In other words, the pilot combustion burner 44 is disposed at the center of the inside of the combustor basket 42, and the plurality of main combustion burners 45 is disposed around the pilot combustion burner 44. A bypass valve 49 is coupled to the transition piece 47. There may be a case where the bypass valve 49 is omitted.

The combustor 12 includes a main nozzle system 112 and a pilot nozzle system 114. The main nozzle system 112 supplies fuel to a nozzle of the main combustion burner 45, and the pilot nozzle system 114 supplies fuel to a nozzle of the pilot combustion burner 44. The main nozzle system 112 is a pipe for supplying the fuel to the nozzle, and supplies the fuel supplied from the fuel supply device 20 to the main combustion burners 45. The pilot nozzle system 114 is a pipe for supplying the fuel to the nozzle, and supplies the fuel supplied from the fuel supply device 20 to the pilot combustion burner 44. The main nozzle system 112 supplies the fuel to the plurality of main combustion burners 45 of the combustor 12. The pilot nozzle system 114 supplies the fuel to a plurality of pilot combustion burners 44 of the combustor 12.

Next, the fuel supply device 20 which supplies fuel to the combustor 12 will be described. The gas turbine plant 2 according to the embodiment may use gas fuel or liquid fuel as fuel. The fuel supply device 20 includes a fuel tank 60, a fuel supply line 62, a first main fuel system 64, a second main fuel system 66, a pilot fuel system 68, a control device 70, a first coupling pipe 102, and a second coupling pipe 104.

The fuel tank 60 is a storing unit which stores fuel, and sends the fuel stored therein to the combustor 12. The fuel supply line 62 is a pipe and supplies the fuel supplied from the fuel tank 60 to the first main fuel system 64, the second main fuel system 66, and the pilot fuel system 68. In other words, the fuel supply device 20 supplies the same fuel to the first main fuel system 64, the second main fuel system 66, and the pilot fuel system 68.

The first main fuel system 64 includes a first branching pipe 72, a first manifold 74, a plurality of first branch pipes 76, a first pressure regulating valve 77, and a first flow regulating valve 78. One end portion of the first branching pipe 72 is connected to the fuel supply line 62, and another end portion thereof is connected to the first manifold 74. The first branching pipe 72 is formed as one pipeline by coupling a plurality of pipes. The first manifold 74 is a ring-shaped pipe disposed to surround an outer circumference of the compressor 11. One end portion of the first branch pipe 76 is connected to the first manifold 74, and another end portion thereof is connected to the first coupling pipe 102. The first branch pipes 76 are provided for the combustors 12, respectively, and the respective first branch pipes 76 are connected to the first coupling pipes 102 corresponding to the respective combustors 12. The first pressure regulating valve 77 is disposed on the first branching pipe 72. The first pressure regulating valve 77 regulates the pressure of the fuel flowing through the first branching pipe 72 by regulating the degree of opening. The first flow regulating valve 78 is disposed on a downstream side of the first pressure regulating valve 77 on the first branching pipe 72. The first flow regulating valve 78 regulates the flow of the fuel flowing through the first branching pipe 72 by regulating the degree of opening.

The second main fuel system 66 includes a second branching pipe 82, a second manifold 84, a plurality of second branch pipes 86, a second pressure regulating valve 87, and a second flow regulating valve 88. One end portion of the second branching pipe 82 is connected to the fuel supply line 62, and another end portion thereof is connected to the second manifold 84. The second branching pipe 82 is formed as one pipeline by coupling a plurality of pipes. The second manifold 84 is a ring-shaped pipe disposed to surround the outer circumference of the compressor 11. One end portion of the second branch pipe 86 is connected to the second manifold 84, and another end portion thereof is connected to the first coupling pipe 102. The second branch pipes 86 are provided for the combustors 12, respectively, and the respective second branch pipes 86 are connected to the first coupling pipes 102 corresponding to the respective combustors 12. The second pressure regulating valve 87 is disposed on the second branching pipe 82. The second pressure regulating valve 87 regulates the pressure of the fuel flowing through the second branching pipe 82 by regulating the degree of opening. The second flow regulating valve 88 is disposed on a downstream side of the second pressure regulating valve 87 on the second branching pipe 82. The second flow regulating valve 88 regulates the flow of the fuel flowing through the second branching pipe 82 by regulating the degree of opening.

The pilot fuel system 68 includes a pilot branching pipe 92, a pilot manifold 94, a plurality of pilot branch pipes 96, a pilot pressure regulating valve 97, and a pilot flow regulating valve 98. One end portion of the pilot branching pipe 92 is connected to the fuel supply line 62, and another end portion thereof is connected to the pilot manifold 94. The pilot manifold 94 is a ring-shaped pipe disposed to surround the outer circumference of the compressor 11. One end portion of the pilot branch pipe 96 is connected to the pilot manifold 94, and another end portion thereof is connected to the pilot nozzle system 114. The pilot branch pipes 96 are provided for the combustors 12, respectively, and the respective pilot branch pipes 96 are connected to the pilot nozzle systems 114 corresponding to the respective combustors 12. The pilot pressure regulating valve 97 is disposed on the pilot branching pipe 92. The pilot pressure regulating valve 97 regulates the pressure of the fuel flowing through the pilot branching pipe 92 by regulating the degree of opening. The pilot flow regulating valve 98 is disposed on a downstream side of the pilot pressure regulating valve 97 on the pilot branching pipe 92. The pilot flow regulating valve 98 regulates the flow of the fuel flowing through the pilot branching pipe 92 by regulating the degree of opening.

The first coupling pipe 102 is disposed to each combustor 12, is connected to the first branch pipe 76, the second branch pipe 86, and the main nozzle system 112, which are disposed to the same combustor 12, and couples the first branch pipe 76, the second branch pipe 86, and the main nozzle system 112. The first coupling pipe 102 is a pipe of which one end portion divides into two branches. The end portion which divides into two branches is coupled to the first branch pipe 76 and the second branch pipe 86, and another end portion thereof is coupled to the main nozzle system 112. The first coupling pipe 102 supplies the fuel supplied from the first branch pipe 76 and the second branch pipe 86 to the main nozzle system 112.

The second coupling pipe 104 couples the first branching pipe 72 and the second branching pipe 82. Specifically, one end portion of the second coupling pipe 104 is coupled to between the first flow regulating valve 78 on the first branching pipe 72 and the first manifold 74, and another end portion thereof is coupled to between the second flow regulating valve 88 on the second branching pipe 82 and the second manifold 84. The second coupling pipe 104 enables the fuel to flow between the first branching pipe 72 and the second branching pipe 82. An on-off valve 104a is disposed on the second coupling pipe 104. Although the on-off valve 104a is provided in the embodiment, the on-off valve 104a may be omitted.

The fuel supply device 20 supplies the fuel in the fuel tank 60 to the main nozzle system 112 from the first main fuel system 64 and the second main fuel system 66. In addition, the fuel supply device 20 supplies the fuel in the fuel tank 60 to the pilot nozzle system 114 from the pilot fuel system 68.

The control device 70 controls the fuel to be supplied to the combustor 12 from the fuel tank 60 by the fuel supply line 62, the first main fuel system 64, the second main fuel system 66, and the pilot fuel system 68. The control device 70 is connected to the first pressure regulating valve 77, the first flow regulating valve 78, the second pressure regulating valve 87, the second flow regulating valve 88, the pilot pressure regulating valve 97, and the pilot flow regulating valve 98, and controls the flows by controlling the degree of opening of the valves. The control device 70 includes a microcomputer centered on a central processing unit (CPU), and in addition to the CPU, a read only memory (ROM) which stores a processing program, a random access memory (RAM) which stores data temporarily, and a storage device as a storage unit.

Figure 3:
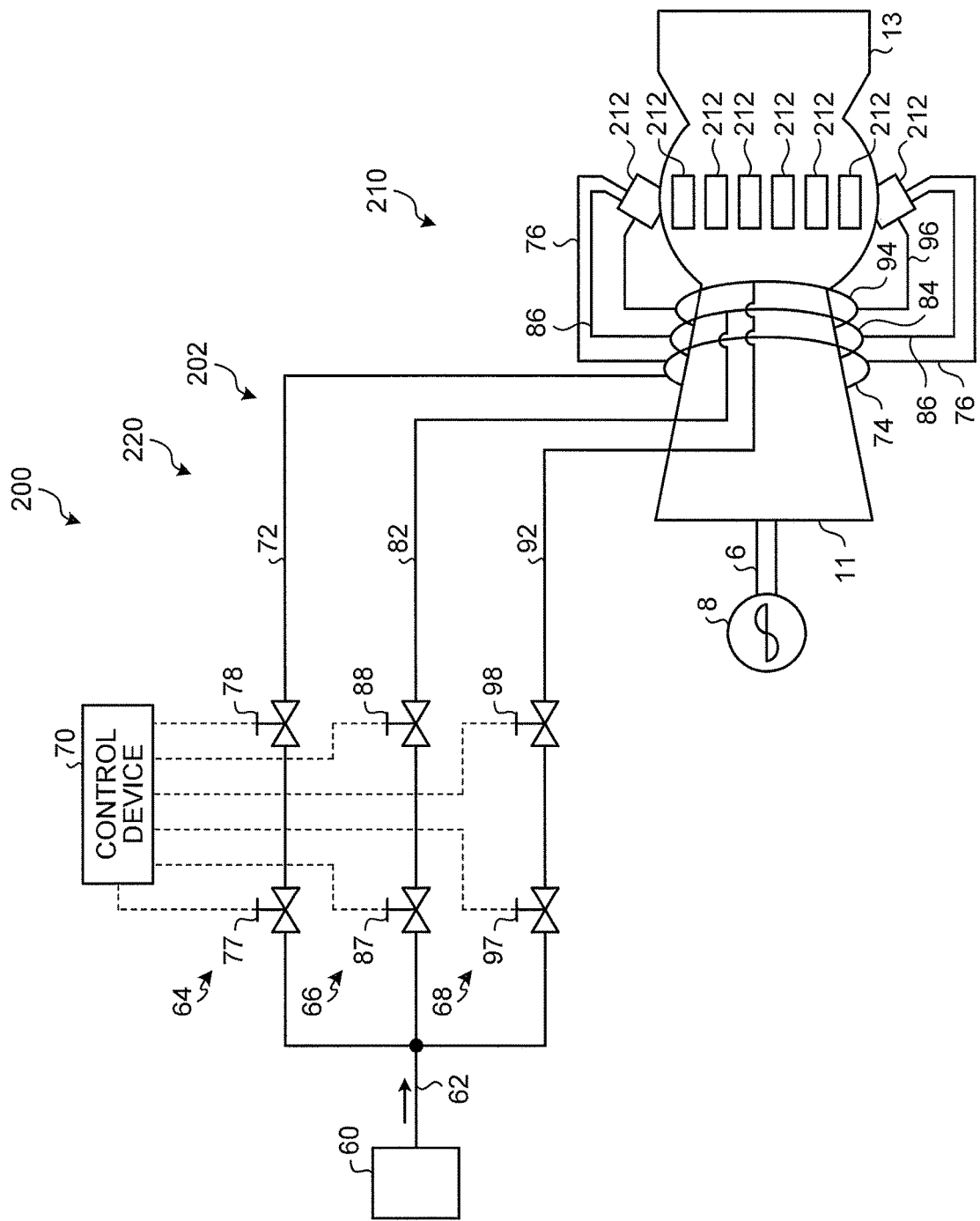
FIG. 3 is a configuration diagram schematically illustrating a power generation system including a gas turbine plant before a combustor is replaced.
Figure 4:
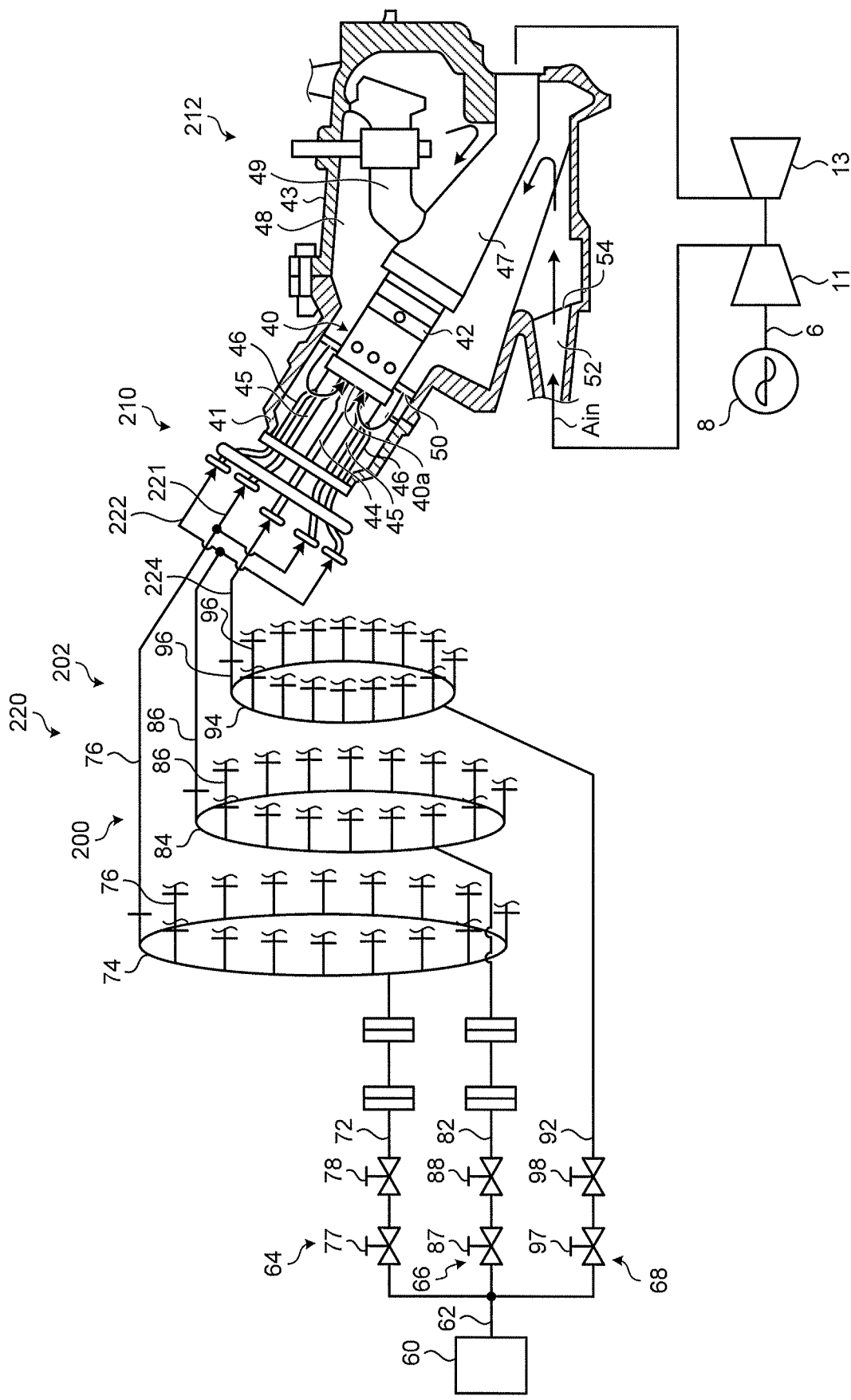
FIG. 4 is a configuration diagram schematically illustrating configurations of a fuel supply device and the combustor in the gas turbine plant illustrated in FIG. 3.

Here, in the above-described power generation system 1, the combustor 12 has replaced another combustor 212. Hereinbelow, a power generation system 200, which is a power generation system before the combustor is replaced, will be described by using FIGS. 3 and 4. FIG. 3 is a configuration diagram schematically illustrating a power generation system including a gas turbine plant before the combustor is replaced. FIG. 4 is a configuration diagram schematically illustrating configurations of the fuel supply device and the combustor in the gas turbine plant illustrated in FIG. 3. The power generation system 200 illustrated in FIGS. 3 and 4 is the same as the power generation system 1 except that the combustors and a part of the fuel supply device are not replaced yet. The same portions as those in the power generation system 1, in other words, portions which have not been replaced are denoted by the same reference signs, and a description thereof will be omitted.

The power generation system 200 illustrated in FIGS. 3 and 4 includes a gas turbine plant 202, the coupling shaft 6, and the generator 8. The gas turbine plant 202 includes a gas turbine 210 and a fuel supply device 220. The gas turbine 210 includes the compressor 11, a plurality of combustors 212, and the turbine 13. The combustors 212 are disposed at predetermined intervals in a rotation direction of the gas turbine 210.

The combustor 212 includes, as combustion burners to which gas fuel is supplied, the pilot combustion burner 44, the main combustion burner (first main combustion burner) 45, and the main combustion burner (second main combustion burner) 46. In other words, the combustor 212 includes two systems of combustion burners as a main combustion burner. The combustor 212 includes a plurality of main combustion burners (first main combustion burners) 45 and a plurality of main combustion burners (second main combustion burners) 46. The combustor 212 is connected to a first main nozzle system 221, a second main nozzle system 222, and a pilot nozzle system 224. The first main nozzle system 221 supplies the fuel to a nozzle of the first main combustion burner 45, the second main nozzle system 222 supplies the fuel to a nozzle of the second main combustion burner 46, and the pilot nozzle system 224 supplies the fuel to a nozzle of the pilot combustion burner 44.

The fuel supply device 220 has the same configuration as that of the fuel supply device 20 except that the fuel supply device 220 does not include the first coupling pipe 102 and the second coupling pipe 104. In the fuel supply device 220, the first branch pipe 76 of the first main fuel system 64 is coupled to the first main nozzle system 221, the second branch pipe 86 of the second main fuel system 66 is coupled to the second main nozzle system 222, and the pilot branch pipe 96 of the pilot fuel system 68 is coupled to the pilot nozzle system 224. In the gas turbine plant 202, three fuel supply systems supply the fuel to three nozzle systems of the combustor, respectively.

Figure 5:
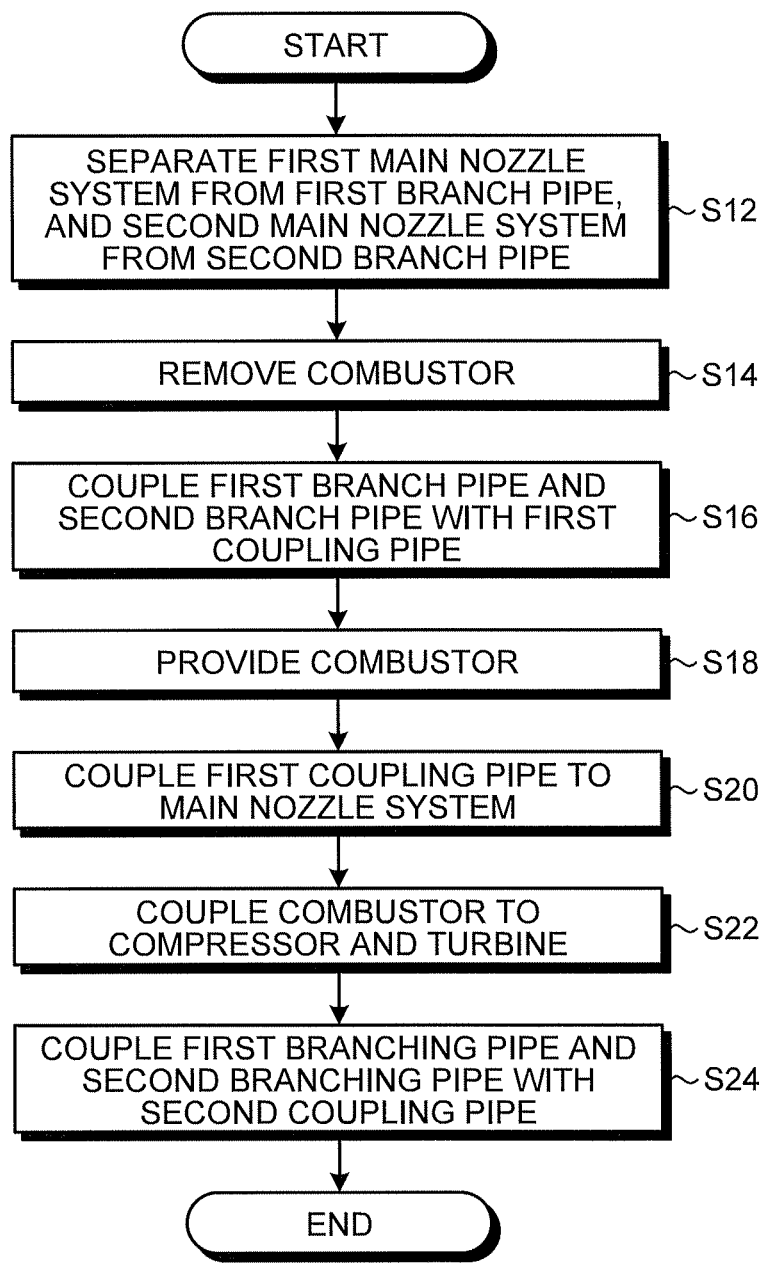
FIG. 5 is a flowchart for explaining an example of a combustor replacement method.

Next, by using FIGS. 5 to 8 in addition to FIGS. 1 to 4, a process will be described in which the combustor 212 of the power generation system 200 (gas turbine plant 202) illustrated in FIGS. 3 and 4 is replaced with the combustor 12 to manufacture the power generation system 1 (gas turbine plant 2) illustrated in FIGS. 1 and 2. FIG. 5 is a flowchart for explaining an example of a combustor replacement method. FIGS. 6 and 8 are configuration diagrams each schematically illustrating a state where the combustor is being replaced. Although a supply system of main fuel, which is characteristic of the embodiment, will be described below, a supply system of pilot fuel is detached/attached in the same manner.

In the combustor replacement method of the embodiment, first, the first main nozzle system 221 and the first branch pipe 76, as well as the second main nozzle system 222 and the second branch pipe 86, which are illustrated in FIG. 4, are separated from each other (Step S12). In other words, respective connected portions are disconnected from each other. By doing so, the combustor 212 is separated from the fuel supply device 220.

Next, the combustor 212 is removed (Step S14). A connected portion of the combustor 212 and the compressor 11, as well as a connected portion of the combustor 212 and the turbine 13 are disconnected from each other, thereby disconnecting the combustor 212 from the gas turbine 210. By doing so, as illustrated in FIG. 6, the combustor 212 is removed from the power generation system 200 illustrated in FIG. 4.

Figure 7:
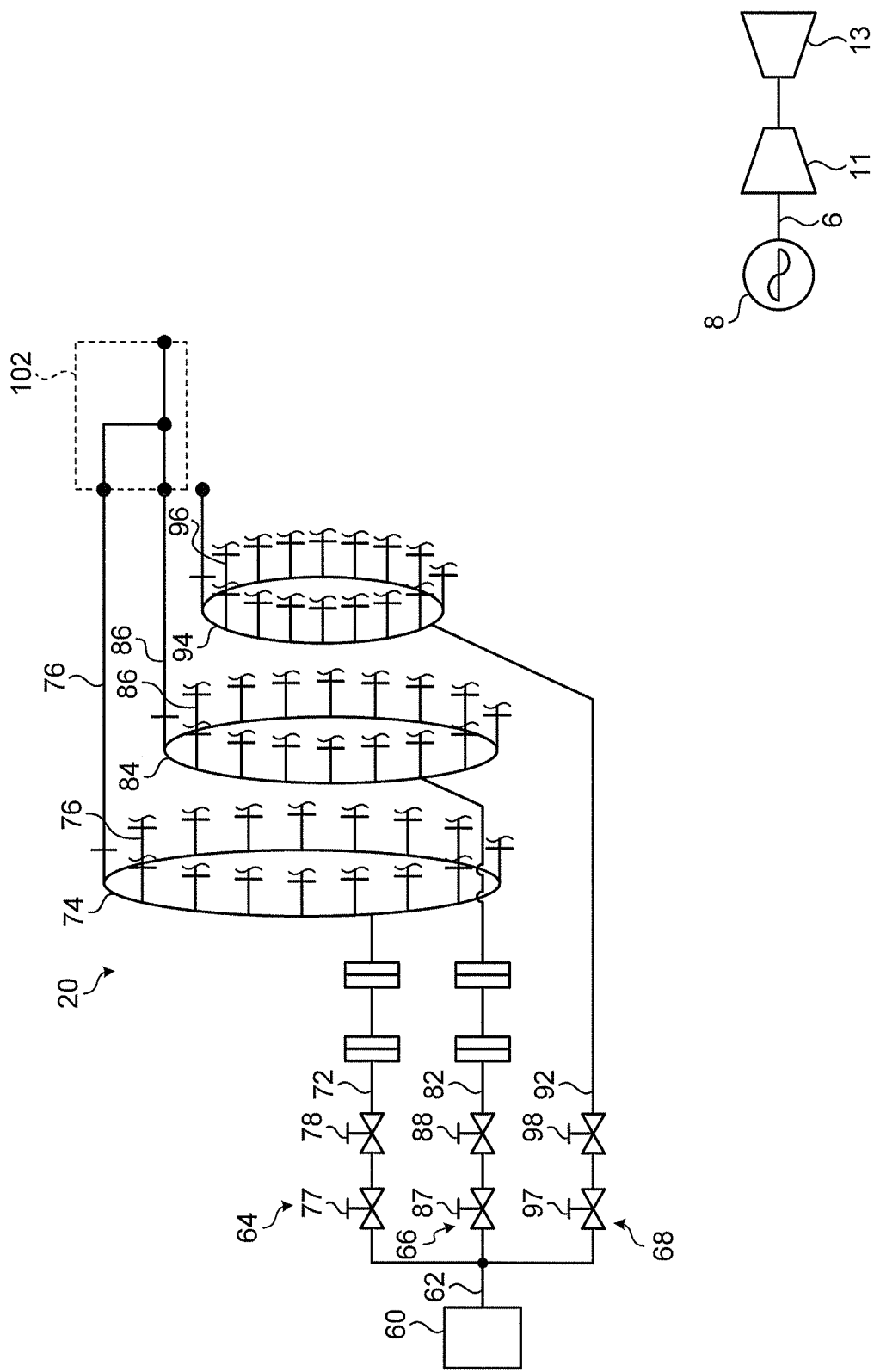
FIG. 7 is a configuration diagram schematically illustrating a state where the combustor is being replaced.
Figure 8:
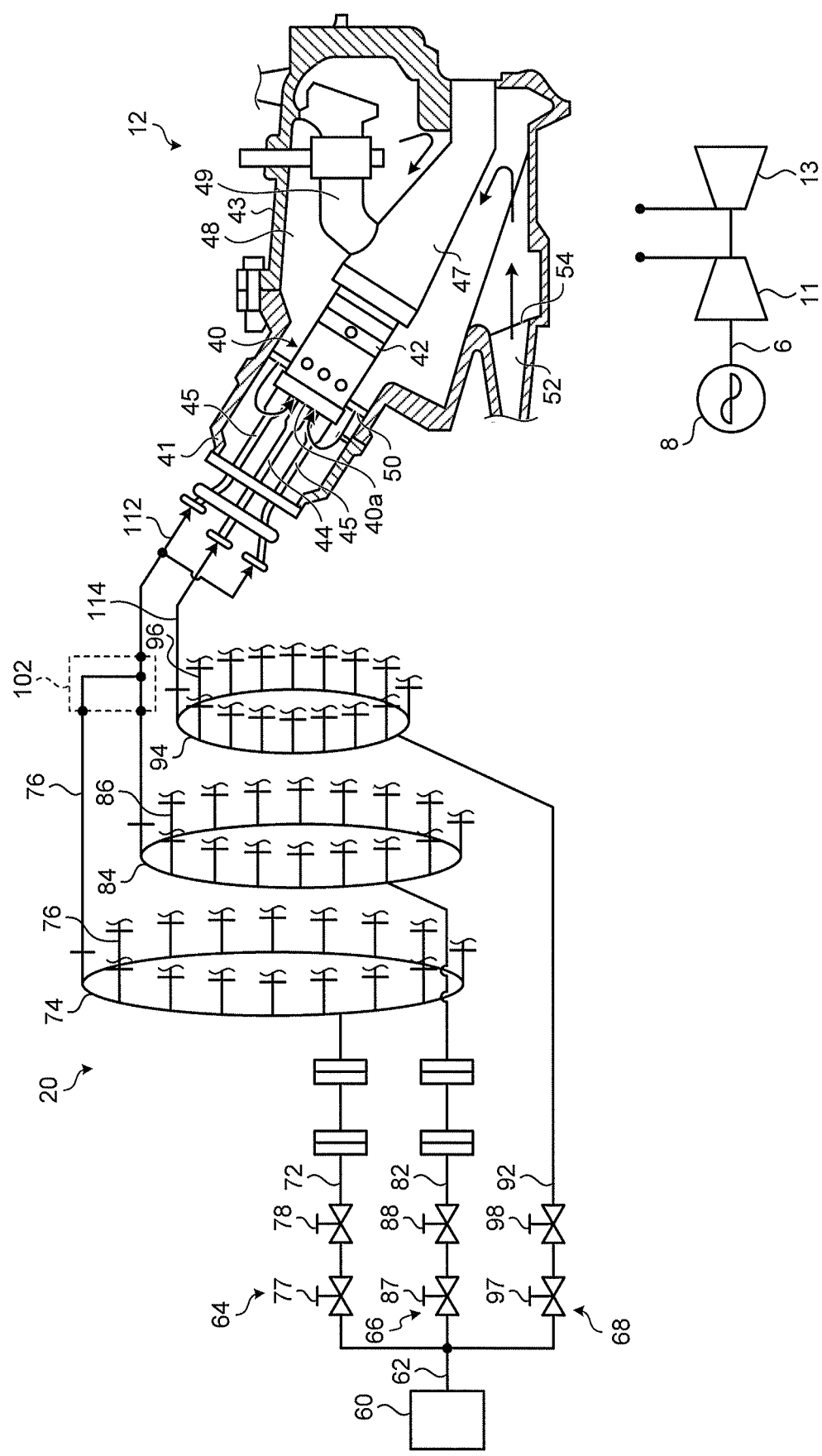
FIG. 8 is a configuration diagram schematically illustrating a state where the combustor is being replaced.

Next, as illustrated in FIG. 7, the first branch pipe 76 and the second branch pipe 86 are coupled with the first coupling pipe 102 (Step S16). By doing so, the first main fuel system 64 and the second main fuel system 66 join together at a downstream end portion in a fuel flow direction. Next, a new combustor 12 is provided at the position where the combustor 212 has been provided (Step S18). The process in Step S16 and the process in Step S18 may be performed in reverse order, or in parallel.

Next, the first coupling pipe 102 and the main nozzle system 112 of the combustor 12 are coupled (Step S20). By doing so, as illustrated in FIG. 8, it is possible to supply the fuel to the gas turbine 12 from the fuel supply device 20.

The combustor 12 is coupled to the compressor 11 and the turbine 13 (Step S22). By doing so, compressed air is supplied to the combustor 12 from the compressor 11, and thereby a combustion gas can be supplied to the turbine 13 from the combustor 12. In addition, the first branching pipe 72 and the second branching pipe 82 are coupled with the second coupling pipe 104 (Step S24, see FIG. 2). Consequently, it is possible for the fuel to flow therebetween on an upstream side of the manifolds.

As described above, the power generation system 1 (gas turbine plant 2) and the combustor replacement method according to the first embodiment can supply the fuel to one main nozzle system 112 from two fuel supply systems by connecting both the first main fuel system 64 and the second main fuel system 66 to the main nozzle system 112 with the first coupling pipe 102. Here, the combustor 212 includes two separate main nozzle systems and the combustor 12 includes one main nozzle system. However, since the combustors 12 and 212 are provided in the same gas turbine, an amount of the fuel to be combusted is the same. Therefore, by making it possible to supply the fuel to one nozzle system from two fuel systems, it is possible to suppress variations in an amount of the fuel which can be supplied from the fuel supply device. In addition, it is possible to reduce work and cost required for the replacement by appropriating a part of the two main fuel systems. Furthermore, regarding the power generation system 1, the manifolds can be used as they are by coupling the first branch pipe 76 and the second branch pipe 86 with the first coupling pipe 102, thereby reducing the number of parts to be replaced.

By coupling an upstream side of the manifolds with the second coupling pipe 104, the power generation system 1 (gas turbine plant 2) and the combustor replacement method can suppress occurrence of a case where when using only one of the fuel systems, air accumulates in the other fuel system. Consequently, stable combustion can be performed.

The second coupling pipe (upstream side coupling pipe) 104 is preferably disposed in the vicinity of tie-in points of the manifolds as in the embodiment. In addition, the second coupling pipe 104 is preferably disposed between the respective manifolds and the respective regulating valves (pressure regulating valves, flow regulating valves). More stable combustion can be performed by providing the second coupling pipe 104 at the above position. In addition, it is possible to use an existing pipe on the upstream side as a long pipe. In other words, it is possible to reuse the existing pipe as much as possible, and to shorten the length of a pipe to be replaced.

By providing the on-off valve 104a on the second coupling pipe 104, the fuel supply device 20 can control supply of fuel for each fuel supply system. In other words, the fuel supply device 20 can operate in a state where the on-off valve 104a is opened, and the first main fuel system 64 and the second main fuel system 66 are connected by the second coupling pipe 104, and in a state where the on-off valve 104a is closed, and the first main fuel system 64 and the second main fuel system 66 are disconnected at the position of the second coupling pipe 104. Consequently, opening and closing can be performed in accordance with the system with which the fuel is supplied. In addition, even when a design is changed such that a manifold is provided for each fuel supply system on a downstream side of the second coupling pipe 104 of the power generation system 1, it is possible to separate the fuel supply system by closing the on-off valve 104a. Consequently, it is possible to leave the second coupling pipe 104 unchanged, so that the replacement can be performed easily, and the degree of freedom in control design can be further increased.

Figure 9:
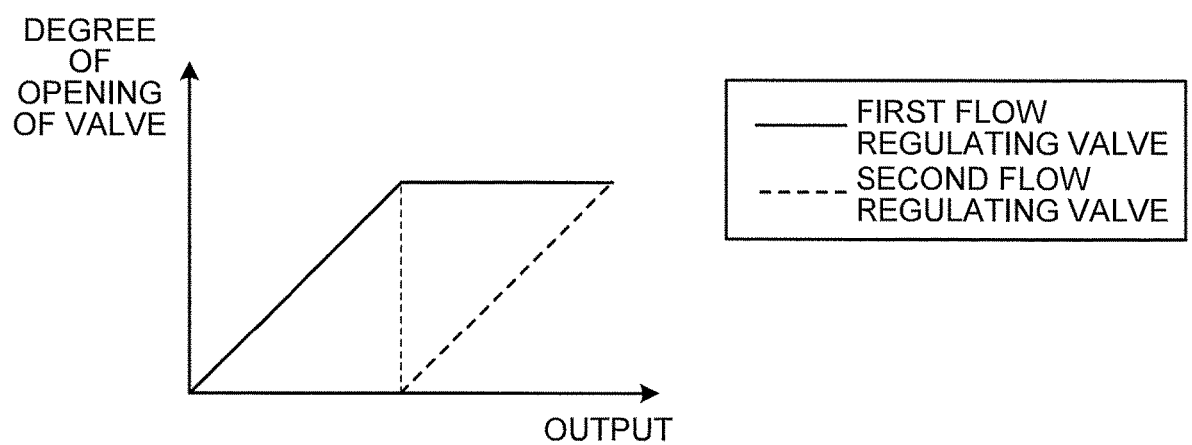
FIG. 9 is an explanatory drawing for explaining an example of an operation of the gas turbine plant.

Next, an example of a fuel supply operation by the control device 70 will be described by using FIG. 9. FIG. 9 is an explanatory drawing for explaining an example of an operation of the gas turbine plant. FIG. 9 is an example of a case where the control device 70 independently controls the first pressure regulating valve 77 of the first main fuel system 64 and the second pressure regulating valve 87 of the second main fuel system 66, and independently controls the first flow regulating valve 78 of the first main fuel system 64 and the second flow regulating valve 88 of the second main fuel system 66. Referring to FIG. 9, a case of controlling a flow will be described. However, the same holds for a pressure. When output (required power generation amount) is small, the control device 70 closes the second flow regulating valve 88 and regulates the degree of opening of the first flow regulating valve 78 only. Thereafter, when the first flow regulating valve 78 has been fully opened and the output increases, the degree of opening of the second flow regulating valve 88 is regulated. By using the respective flow regulating valves as described above, it is possible to narrow down the number of valves to be regulated in each output to one.

Referring to FIG. 9, a case has been described where the control device 70 independently controls the first pressure regulating valve 77 of the first main fuel system 64 and the second pressure regulating valve 87 of the second main fuel system 66, and independently controls the first flow regulating valve 78 of the first main fuel system 64 and the second flow regulating valve 88 of the second main fuel system 66. However, the control device 70 may control the first pressure regulating valve 77 of the first main fuel system 64 and the second pressure regulating valve 87 of the second main fuel system 66 in an interlocking manner, and may control the first flow regulating valve 78 of the first main fuel system 64 and the second flow regulating valve 88 of the second main fuel system 66 in an interlocking manner. By doing so, it is possible to control the two valves as one valve, and also in that case, it is possible to make the regulation thereof easy. Also in a case where the valves are controlled in an interlocking manner, it is preferable to open or close the valves independently, in other words, to open or close the valves with a time lag.

Here, a power generation system (gas turbine plant) obtained by replacing the combustor of the power generation system 200 (gas turbine plant 202) is not limited to that described above. In other words, a configuration in which fuel is supplied to one nozzle system from a plurality of fuel supply systems is not limited to the above first embodiment.

Second Embodiment

Figure 10:
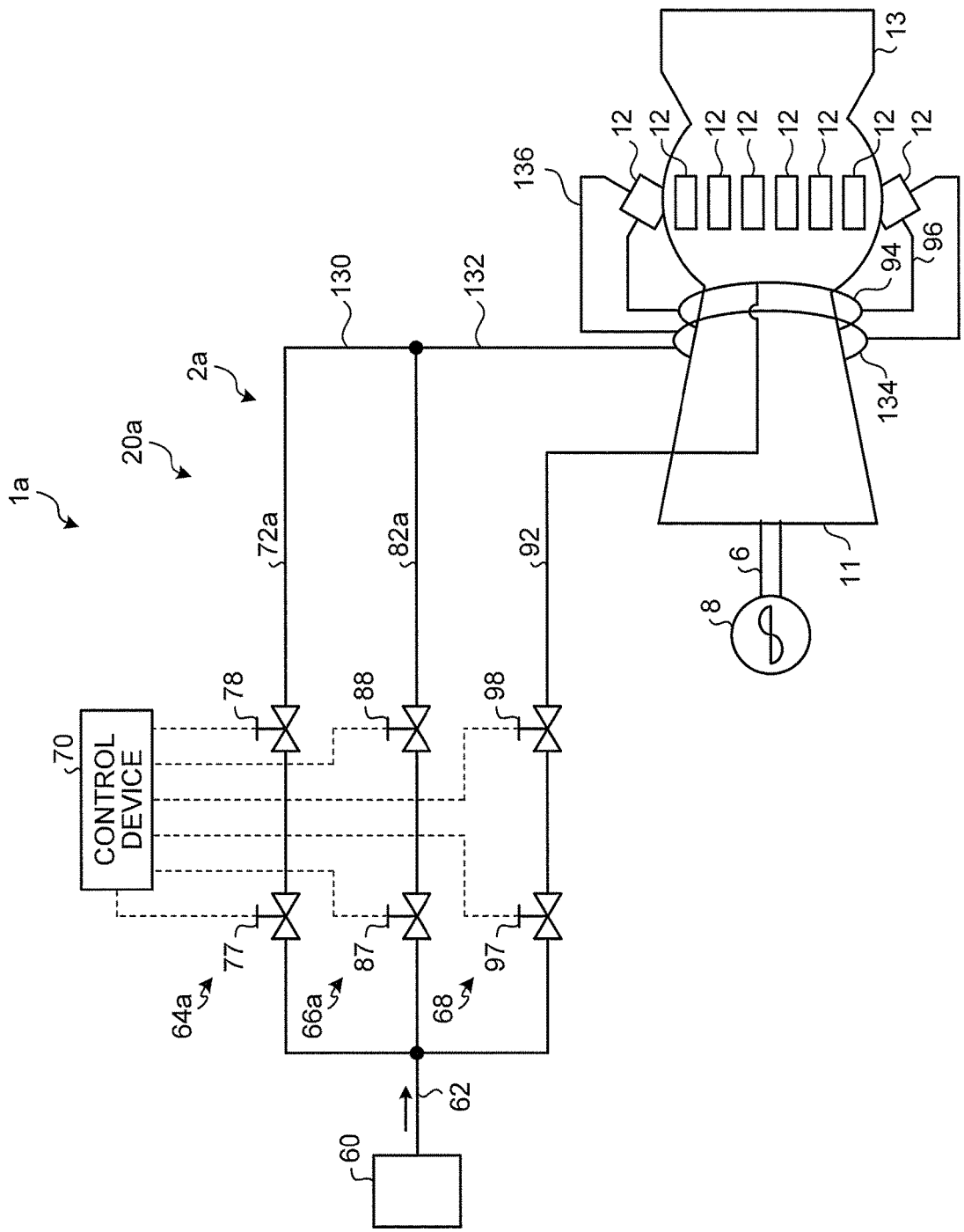
FIG. 10 is a configuration diagram schematically illustrating a power generation system including a gas turbine plant according to a second embodiment.
Figure 11:
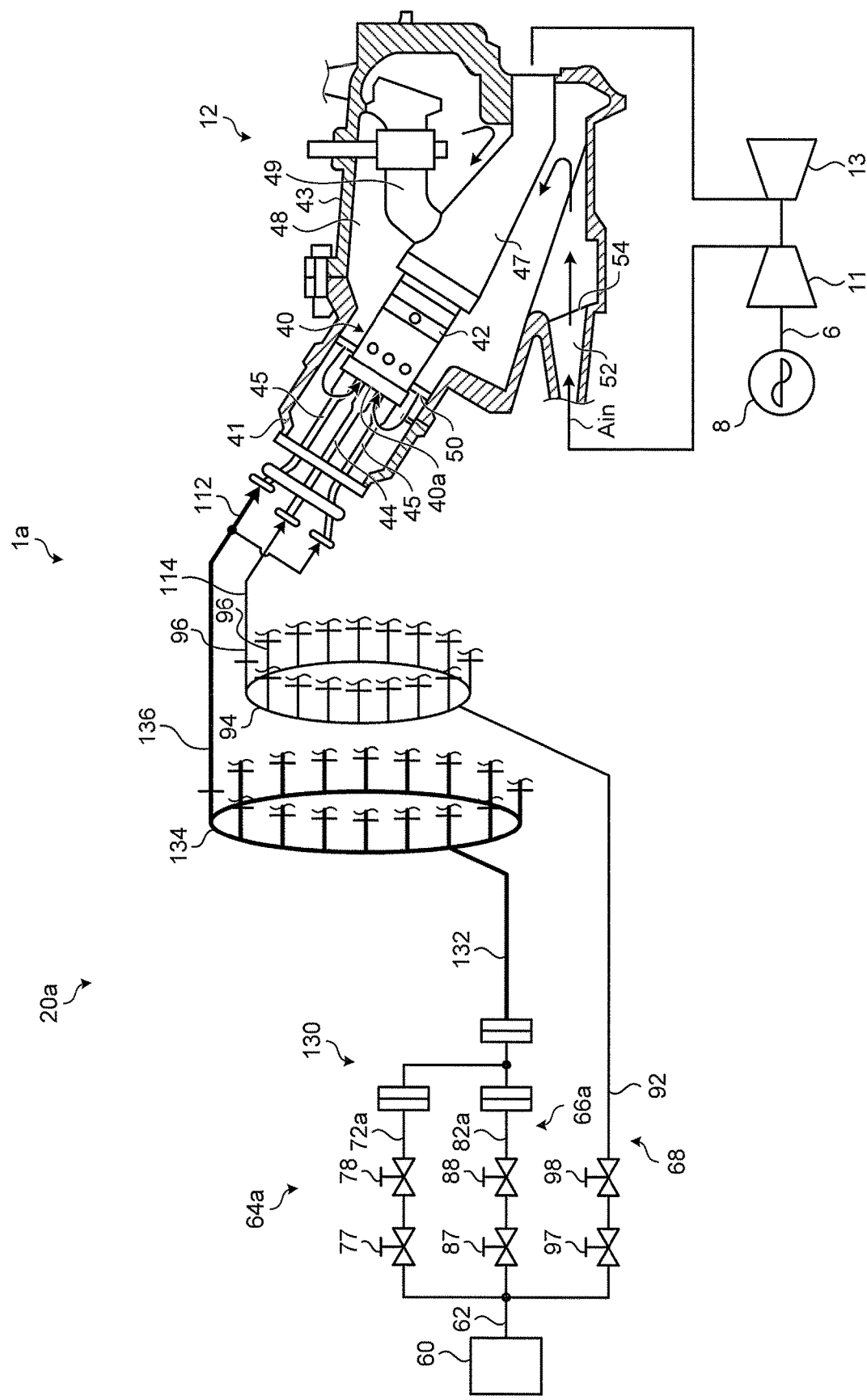
FIG. 11 is a configuration diagram schematically illustrating configurations of a fuel supply device and a combustor in the gas turbine plant illustrated in FIG. 10.

FIG. 10 is a configuration diagram schematically illustrating a power generation system including a gas turbine plant according to a second embodiment. FIG. 11 is a configuration diagram schematically illustrating configurations of a fuel supply device and a combustor in the gas turbine plant illustrated in FIG. 10.

A configuration of a power generation system 1a illustrated in FIGS. 10 and 11 is the same as that of the power generation system 1 except for a configuration of a fuel supply device 20a. Hereinbelow, a description will be given focused on points unique to the power generation system 1a. The fuel supply device 20a of a gas turbine plant 2a of the power generation system 1a includes a first main fuel system 64a, a second main fuel system 66a, a pilot fuel system 68, a coupling pipe 130, a main pipe 132, a main manifold 134, and a branch pipe 136. The pilot fuel system 68 has the same configuration as that of the pilot fuel system 68 of the fuel supply device 20.

The first main fuel system 64a includes a first branching pipe 72a, a first pressure regulating valve 77, and a first flow regulating valve 78. One end portion of the first branching pipe 72a is coupled to a fuel supply line 62, and another end portion thereof is coupled to the coupling pipe 130. The first pressure regulating valve 77 and the first flow regulating valve 78 are disposed on the first branching pipe 72a in this order from the upstream.

The second main fuel system 66a includes a second branching pipe 82a, a second pressure regulating valve 87, and a second flow regulating valve 88. One end portion of the second branching pipe 82a is coupled to the fuel supply line 62, and another end portion thereof is coupled to the coupling pipe 130. The second pressure regulating valve 87 and the second flow regulating valve 88 are disposed on the second branching pipe 82a in this order from the upstream.

The coupling pipe 130 is connected to the first branching pipe 72a, the second branching pipe 82a, and the main pipe 132, and couples the first branching pipe 72a, the second branching pipe 82a, and the main pipe 132. The coupling pipe 130 is a pipe of which one end portion divides into two branches. The end portion which divides into branches is coupled to the first branching pipe 72a and the second branching pipe 82a, and another end portion thereof is coupled to the main pipe 132. The coupling pipe 130 supplies fuel supplied from the first branching pipe 72a and the second branching pipe 82a to the main pipe 132.

One end portion of the main pipe 132 is coupled to the coupling pipe 130, and another end portion thereof is coupled to the main manifold 134. The main pipe 132 supplies the fuel supplied from the coupling pipe 130 to the main manifold 134. The main manifold 134 is a ring-shaped pipe disposed to surround the outer circumference of the compressor 11. A plurality of the branch pipes 136 is coupled to the main manifold 134. The branch pipe 136 is disposed in each combustor 12, and supplies the fuel in the main manifold 134 to the main nozzle system 112.

The fuel supply device 20a combines the fuel supplied from the first main fuel system 64a and the fuel supplied from the second main fuel system 66a in the coupling pipe 130, and causes the fuel to pass through the main pipe 132. Then, the fuel supply device 20a divides the fuel for each combustor 12 in the main manifold 134 and the plurality of branch pipes 136, and supplies the fuel to the respective main nozzle systems 112 from the respective branch pipes 136.

Figure 12:
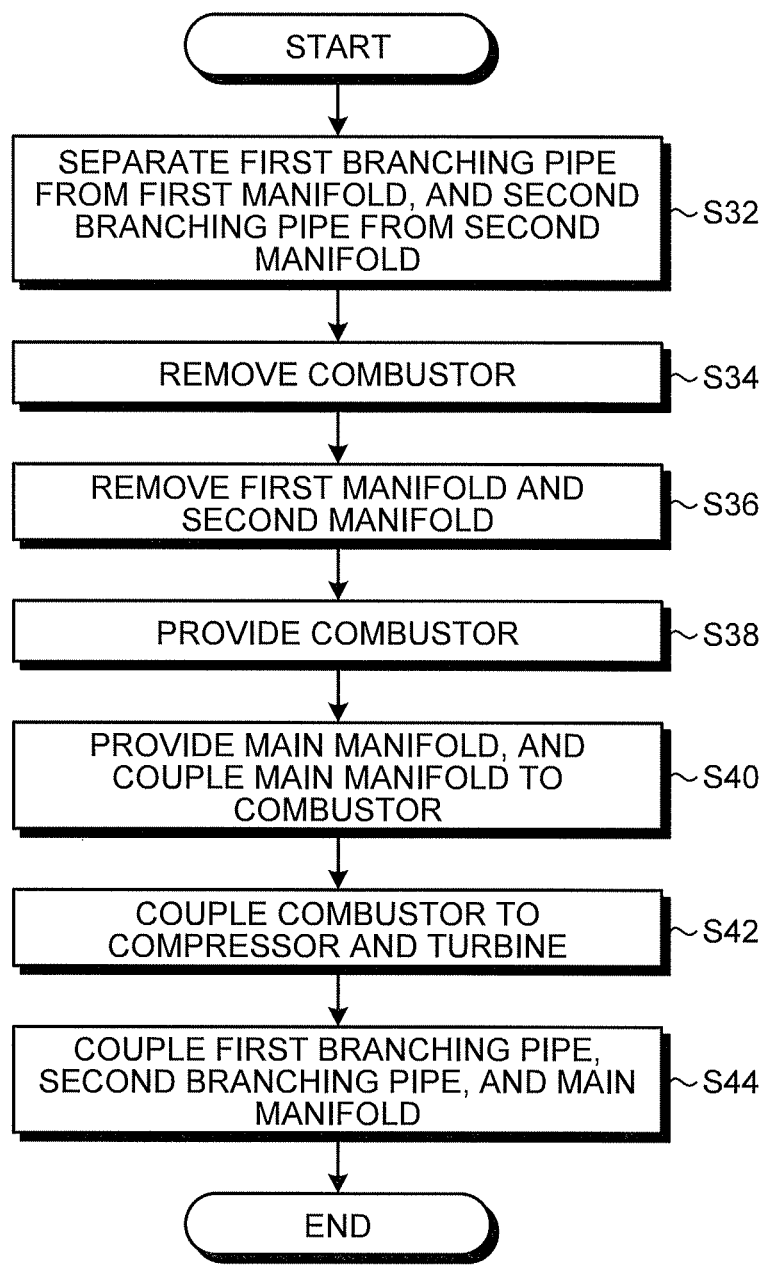
FIG. 12 is a flowchart for explaining another example of the combustor replacement method.
Figure 14:
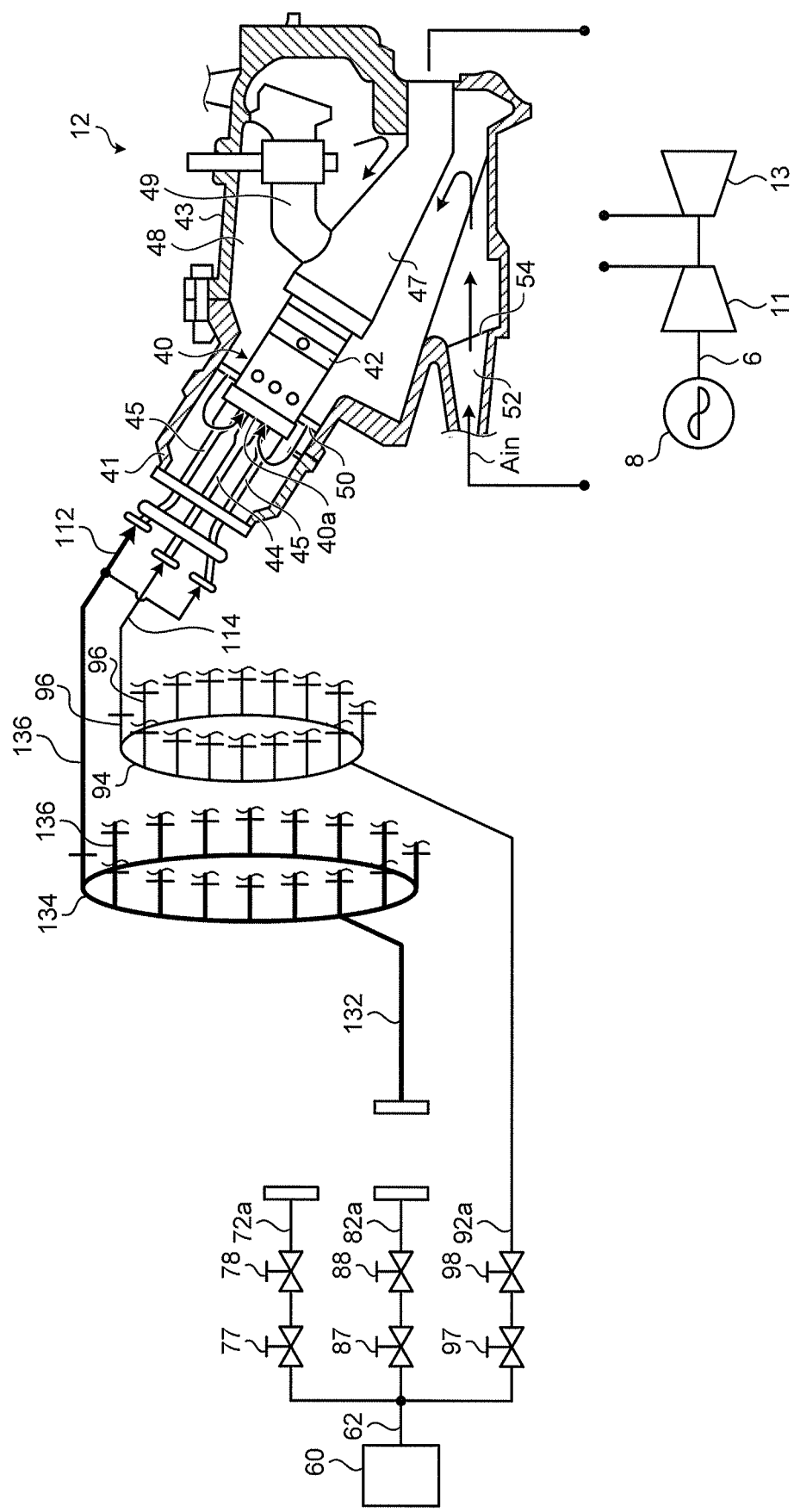
FIG. 14 is a configuration diagram schematically illustrating a state where the combustor is being replaced.

Next, by using FIG. 4 and FIGS. 12 to 14, a combustor replacement method will be described in which the combustor 112 of the power generation system 200 is replaced to produce the power generation system 1a. FIG. 12 is a flowchart for explaining another example of the combustor replacement method. FIGS. 13 and 14 are configuration diagrams each schematically illustrating a state where the combustor is being replaced.

First, the first branching pipe 72 and the first manifold 74, as well as the second branching pipe 82 and the second manifold 84, which are illustrated in FIG. 4, are separated from each other (Step S32). In other words, respective connected portions are disconnected from each other. By doing so, the first manifold 74 and the second manifold 84 are separated from other parts in the fuel supply device 220. In a case where the first branching pipe 72 and the second branching pipe 82 have a configuration including a plurality of pipes coupled to each other, coupled portions of the pipes may be separated from each other.

Next, the combustor 212 is removed (Step S34). A connected portion of the combustor 212 and the compressor 11, as well as a connected portion of the combustor 212 and the turbine 13 are disconnected from each other, thereby disconnecting the combustor 212 from the gas turbine 210. When removing the combustor 212, the combustor 212 and the first manifold 74, as well as the combustor 212 and the second manifold 84 are separated by separating and removing the branch pipes 76 and 86 from the combustor 212. By doing so, it is possible to perform removal operations of the combustors 212 individually. Next, the first manifold 74 and the second manifold 84 are removed (Step S36). By doing so, as illustrated in FIG. 13, the combustor 212, the first manifold 74, the second manifold 84, and the branch pipes 76 and 86 are removed from the power generation system 200.

Next, as illustrated in FIG. 14, a new combustor 12 is provided (Step S38), a new main manifold 134 is provided, and the combustor 12 and the main manifold 134 are coupled (Step S40). In other words, the combustor 12 and the main manifold 134 are provided, and the main nozzle system 112 of the combustor 12 and the branch pipe 136 are coupled. Then, a pilot nozzle system 114 and a pilot branch pipe 96 are coupled. The new combustor 12 may be provided after the main manifold 134 is provided. Consequently, as illustrated in FIG. 14, the combustor 12 and the main manifold 134 are provided at a predetermined position of the gas turbine plant.

Next, the combustor 12 is coupled to the compressor 11 and the turbine 13 (Step S42). By doing so, compressed air is supplied to the combustor 12 from the compressor 11, and thereby a combustion gas can be supplied to the turbine 13 from the combustor 12. In addition, the first branching pipe 72a and the second branching pipe 82a are coupled to the main manifold 134 (Step S44). Specifically, as illustrated in FIG. 11, the first branching pipe 72a, the second branching pipe 82a, and the main pipe 132 are coupled with the coupling pipe 130. By doing so, it is possible to supply the fuel to the main manifold 134 from the first branching pipe 72a and the second branching pipe 82a.

As in the case of the power generation system 1a (gas turbine plant 2a), in a fuel supply system for supplying fuel to nozzle systems which are subsequently narrowed to one nozzle system, even when a manifold of the fuel supply system is replaced, it is possible to use the existing facility regarding the upstream side portions in the fuel supply system. Consequently, it is possible to make the replacement easy. It is preferable for the main pipe 132 to have a larger flow area than the first branching pipe 72a and the second branching pipe 82a. It is preferable for the main manifold 134 to have a larger flow area than the first manifold 74 and the second manifold 84. By doing so, it is possible to supply the fuel in a similar manner.

Here, in the above embodiment, the description has been given for the case where a combustor provided with two main nozzle systems is replaced with a combustor provided with one main nozzle system, and a power generation plant including the replaced combustor. However, there is no limitation thereto. The nozzle systems to be integrated by the replacement of the combustor may be other nozzle systems. For example, when a combustor provided with two top hat nozzle systems is replaced with a combustor provided with one top hat nozzle system, the fuel supply systems may be coupled in a similar manner, and when a combustor provided with two pilot nozzle systems is replaced with a combustor provided with one pilot nozzle system, the fuel supply systems may be coupled in a similar manner. In addition, when a combustor provided with three or more main nozzle systems is replaced with a combustor provided with one main nozzle system, the fuel supply systems may be coupled in a similar manner.

REFERENCE SIGNS LIST

1 Power generation system
2 Gas turbine plant
6 Coupling shaft
8 Generator
10 Gas turbine
11 Compressor
12 Combustor
13 Turbine
20 Fuel supply device
40 Combustor main body
40a Air inflow port
41 Combustor compressor casing
42 Combustor basket
43 Turbine casing
44 Pilot combustion burner
45 Main combustion burner (first main combustion burner)
46 Second main combustion burner
47 Transition piece
48 Chamber
49 Bypass valve
50 Flow straightening plate
52 Diffuser unit
54 Strut
60 Fuel tank
62 Fuel supply line
64 First main fuel system
66 Second main fuel system
68 Pilot fuel system
70 Control device
72 First branching pipe
74 First manifold
76 First branch pipe
77 First pressure regulating valve
78 First flow regulating valve
82 Second branching pipe
84 Second manifold
86 Second branch pipe
87 Second pressure regulating valve
88 Second flow regulating valve
92 Pilot branching pipe
94 Pilot manifold
96 Pilot branch pipe
97 Pilot pressure regulating valve
98 Pilot flow regulating valve
102 First coupling pipe
104 Second coupling pipe
112 Main nozzle system
114, 224 Pilot nozzle system
134 Main manifold
221 First main nozzle system
222 Second main nozzle system

The invention claimed is:

1. A combustor replacement method for replacing a combustor of a gas turbine in a gas turbine plant including the combustor and a plurality of fuel supply systems that supplies fuel to the combustor, the method comprising the steps of:

separating, from the plurality of fuel supply systems, a first combustor that comprises a plurality of first nozzle systems connected to any of the plurality of fuel supply systems and supplied with the fuel from the connected fuel supply systems, and removing the first combustor from the gas turbine plant;

attaching a second combustor to the gas turbine plant, the second combustor comprises a plurality of second nozzle systems, wherein the number of second nozzle systems of the second combustor is fewer than the number of first nozzle systems of the first combustor; and providing communication by a coupling pipe between one fuel supply system and another fuel supply system of the plurality of fuel supply systems connected to the plurality of second nozzle systems, and coupling the fuel supply systems and the second combustor.

2. The combustor replacement method according to claim 1, wherein
the fuel supply systems comprise a plurality of manifolds and a plurality of branch pipes that connect the plurality of manifolds and the coupling pipe, and
the coupling pipe connects the plurality of branch pipes and the plurality of second nozzle systems.

3. The combustor replacement method according to claim 2, further comprising a step of providing communication between the fuel supply systems by an upstream side coupling pipe on an upstream side of the manifolds connected to the plurality of second nozzle systems.

4. The combustor replacement method according to claim 3, wherein the upstream side coupling pipe is disposed in the vicinity of the manifolds.

5. The combustor replacement method according to claim 3, wherein the fuel supply systems each comprise a regulating valve that regulates supply of the fuel on an upstream side of the manifold, and the upstream side coupling pipe is disposed between the manifold and the regulating valve.

6. The combustor replacement method according to claim 3, wherein the upstream side coupling pipe comprises an on-off valve disposed thereon.

7. The combustor replacement method according to claim 1, further comprising the steps of:

removing respective manifolds of the fuel supply systems connected to the plurality of second nozzle systems; and providing a common manifold in the fuel supply systems connected to the plurality of second nozzle systems, wherein the coupling pipe is a first coupling pipe, and wherein a second coupling pipe is provided on an upstream side of the manifold.

* * * * *